(12) United States Patent
Shannon

(10) Patent No.: US 7,448,519 B2
(45) Date of Patent: Nov. 11, 2008

(54) HEATER UNIT FOR DISPENSING METERED PORTIONS OF MOLTEN LEAD

(75) Inventor: John K. Shannon, Racine, WI (US)

(73) Assignee: MiTek Holdings, Inc., Chesterfield, MO (US)

( * ) Notice: Subject to any disclaimer, the term of this patent is extended or adjusted under 35 U.S.C. 154(b) by 30 days.

(21) Appl. No.: 11/612,298

(22) Filed: Dec. 18, 2006

(65) Prior Publication Data

US 2007/0151994 A1 Jul. 5, 2007

Related U.S. Application Data

(62) Division of application No. 10/988,650, filed on Nov. 15, 2004, now Pat. No. 7,159,745, which is a division of application No. 09/862,792, filed on May 22, 2001, now Pat. No. 6,834,424.

(51) Int. Cl.
*B22D 35/06* (2006.01)
*B22D 41/005* (2006.01)

(52) U.S. Cl. ........................ 222/594; 222/591

(58) Field of Classification Search ................. 222/590, 222/591, 593, 594
See application file for complete search history.

(56) References Cited

U.S. PATENT DOCUMENTS

| | | |
|---|---|---|
| 2,839,653 A | 6/1958 | Kane |
| 3,444,920 A | 5/1969 | McAlpine et al. |
| 4,341,256 A | 7/1982 | Eberle |
| 4,742,611 A | 5/1988 | Meadows et al. |
| 5,206,987 A | 5/1993 | Mix |
| 5,487,496 A | 1/1996 | Benson |
| 5,505,744 A | 4/1996 | Eberle et al. |
| 5,620,809 A | 4/1997 | Shannon et al. |
| 5,645,612 A | 7/1997 | Shannon et al. |
| 5,685,357 A | 11/1997 | Kato et al. |
| 5,698,658 A * | 12/1997 | Dujari et al. ............ 164/133 |
| 5,885,731 A | 3/1999 | Shannon et al. |
| 6,059,848 A | 5/2000 | Shannon et al. |
| 6,119,762 A | 9/2000 | Miyagi et al. |
| 6,588,486 B1 | 7/2003 | Takayama et al. |
| 6,834,424 B2 | 12/2004 | Shannon |
| 7,159,745 B2 | 1/2007 | Shannon |

FOREIGN PATENT DOCUMENTS

| | | |
|---|---|---|
| EP | 0297714 A2 | 1/1989 |
| EP | 0583021 A1 | 2/1994 |
| EP | 0734084 A1 | 9/1996 |

* cited by examiner

*Primary Examiner*—Scott Kastler
(74) *Attorney, Agent, or Firm*—Senniger Powers LLP

(57) ABSTRACT

A heater unit for dispensing metered portions of molten lead includes a cavity capable of selectively receiving a metered portion of molten lead from the lead reservoir. The heater unit is moveable between a first position for receiving lead into the lead reservoir and a second position for dispensing molten lead from the cavity.

13 Claims, 14 Drawing Sheets

150
HEATER UNIT FOR DISPENSING METERED PORTIONS OF MOLTEN LEAD

CROSS-REFERENCE TO RELATED APPLICATION

This application is a divisional application of U.S. patent application Ser. No. 10/988,650, filed Nov. 15, 2004, now U.S. Pat. No. 7,159,745 which is a divisional application of U.S. patent application Ser. No. 09/862,792, filed on May 22, 2001, now U.S. Pat. No. 6,834,424, the entirety of each application is hereby incorporated by reference.

FIELD OF THE INVENTION

The present invention generally relates to a heater unit for dispending metered portions of molten lead.

BACKGROUND OF THE INVENTION

A present problem of lead acid battery manufacture is the rapid oxidation of molten lead which is exposed to the atmosphere when it is heated above the 625 degrees Fahrenheit melting point. The problem is greatly compounded when molten lead exposed to the atmosphere is further heated to nearly 1000 degrees Fahrenheit. Plate lugs of the battery cells enter such dispensed high temperature molten lead and fuse with it, the lugs further act as heat sinks for cooling the dispensed lead. At such elevated temperatures substantial drossing can occur which is wasteful, expensive, abrasive, clogging and toxic.

Accordingly, there is a clearly felt need in the art for a battery assembling machine which does not expose molten lead to the atmosphere, thus preventing drossing of the molten lead.

SUMMARY OF THE INVENTION

In one aspect, a heater unit for dispensing metered portions of molten lead comprises a lead reservoir in the heater unit for retaining molten lead. A heater body is adjacent to the reservoir for providing heat to the molten lead. A cavity in the heater unit is capable of selectively receiving a metered portion of molten lead from the lead reservoir. The heater unit is moveable between a first position for receiving lead into the lead reservoir and a second position for dispensing molten lead from the cavity.

DETAILED DESCRIPTION OF THE INVENTION

Figure 1:
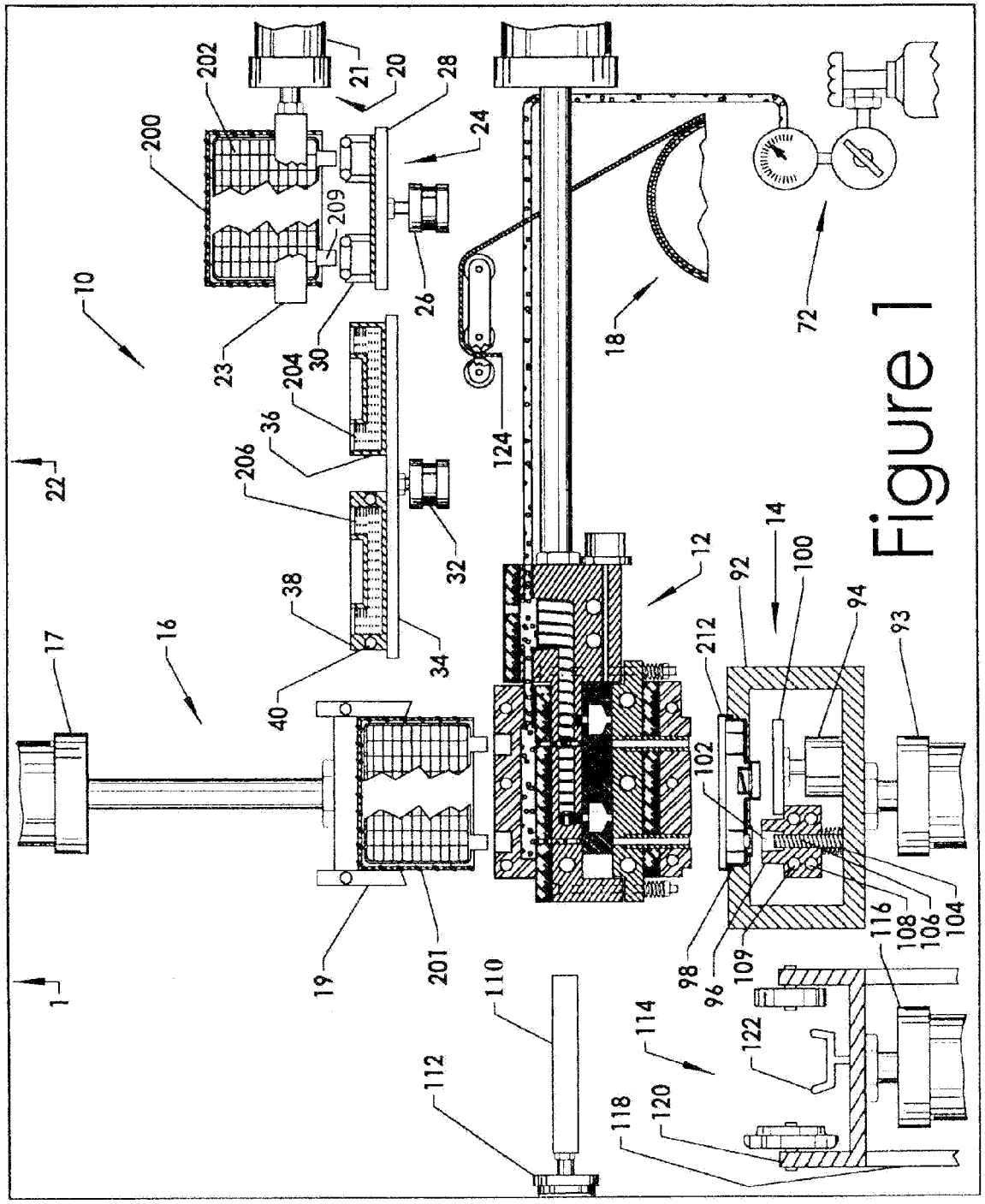
FIG. 1 is a cross sectional view of a battery assembling method with two batteries at different positions of the process.

With reference now to the drawings, and particularly to FIG. 1, there is shown a cross sectional view of a battery assembling method. With reference to FIGS. 2-14, the battery assembling method includes a lead dispenser/heater unit 12, cover positioner 14, container positioner 16, and lead feeder 18. A first battery container 200 with battery plates 202 contained therein is retained by a horizontal container positioner 20. The horizontal container positioner 20 includes a horizontal container actuator 21 and gripper fingers 23. The above items are preferably retained in some type of frame 22.

A lug preparation area 10 is not required when utilizing some types of lead alloys. If needed, the lug preparation area includes at least one heating station 24. The at least one heating station 24 preferably includes a heating actuation device 26, a mounting plate 28, and at least one heating element 30. Preferably, an inductive heating element is used, but other types of heating devices may also be used. The lug preparation area 10 may also include at least one fluxing station, and at least one tinning station. The inclusion of the fluxing and tinning stations is dependent upon the condition of the plate lugs of the battery and the lead alloy used in the battery, before insertion into the battery assembling device 1.

The lug preparation area 10 disclosed in this application is given by way of example and not by way of limitation. A lug preparation area may include any combination or order of the above disclosed stations. As disclosed by example in this application, a lug actuator 32 is used to provide vertical movement to a lug plate 34. A fluxing pan 36 is attached to a top of the lug plate 34 and contains a quantity of flux 204. A tinning pan 38 is attached to a top of the lug plate 34 and contains a quantity of molten solder 206. At least one heater element 40 is used to maintain the solder at a molten temperature. The container positioner 16 includes a container actuator 17 and container gripping fingers 19 which are attached to a moving end of the container actuator 17.

Figure 2:
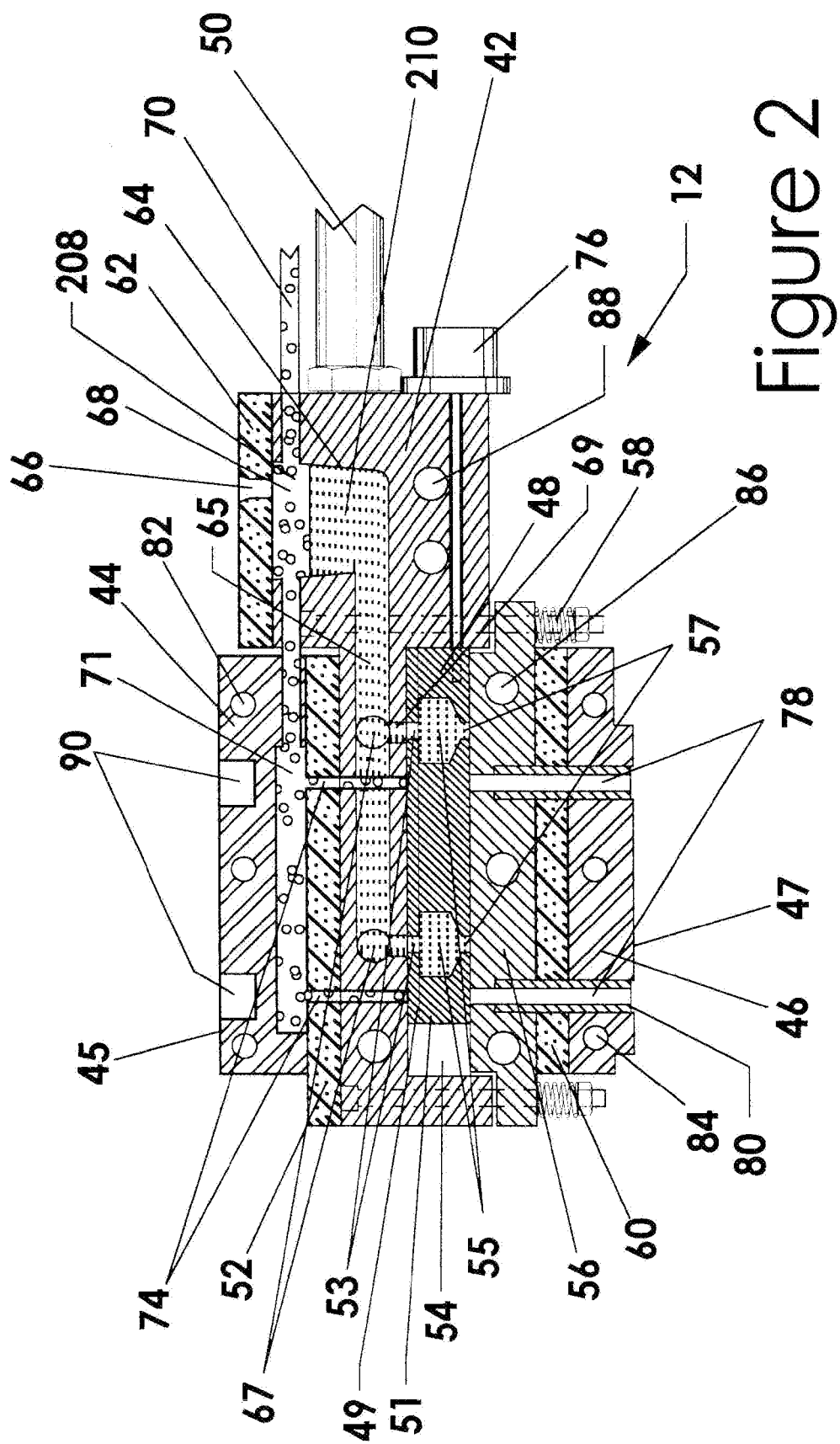
FIG. 2 is an enlarged cross sectional view of a lead dispenser/heater unit in accordance with the present invention.

With reference to FIG. 2, the lead dispenser/heater unit 12 includes a heater body 42, a container heating platen 44, a cover heating platen 46, a lead dispensing shuttle plate 48, and a dispenser actuator 50. The container heating platen 44 is attached to a top of the heater body 42 with a cover insulator 52 inserted therebetween. The lead dispensing shuttle plate 48 preferably includes a top plate 49 and a bottom plate 51. At least two lead entrance openings 53 are formed through the top plate 49. At least two lead metered cavities 55 are formed in the lead dispensing shuttle plate 48 in line with the at least two lead entrance openings 53. A lead exit opening 57 is formed through a bottom of each lead metered cavity 55. A shuttle slot 54 is formed in a bottom of the heater body 42. The shuttle slot 54 is sized to slidably receive the lead dispensing shuttle plate 48.

A shuttle retention plate 56 retains the lead dispensing shuttle plate 48 under spring force. At least two spring loaded bolts 58 force a top of the shuttle retention plate 56 against a bottom of the lead dispensing shuttle plate 48 and a top of the lead dispensing shuttle plate 48 against a top of the shuttle slot 54. The force fit between the top and bottom of the lead dispensing shuttle plate 48 is required to prevent molten lead from leaving the lead metered cavities 55 and smearing on the top or bottom of the lead dispensing shuttle plate 48. The cover heating platen 46 is attached to a bottom of the shuttle retention plate 56 with a container insulator 60 inserted therebetween. The container and cover insulators allow the container and cover heating platens to be maintained at a different temperature than the heater body 42.

A lead reservoir cover plate 62 covers a top of a lead reservoir 64 formed in a top of the heater body 42. A lead strip opening 66 is formed through the lead reservoir cover plate 62, adjacent the lead reservoir 64. A lead passage 65 is formed adjacent the lead reservoir 64. At least one lead cross passage 67 is formed adjacent the lead passage 65. At least two lead feed openings 69 are supplied with molten lead 210 from the lead passage 65 or at least one lead cross passage 67. An inert gas reservoir passage 68 is formed over the lead reservoir 64. The inert gas reservoir passage 68 receives inert gas through an inlet pipe 70. An inert gas tank 72 supplies the inert gas 208. The inert gas 208 prevents drossing of the molten lead 210 in the lead reservoir 64. An inert gas passage 71 is formed in a bottom of the container heater platen 44. At least two inert gas passage openings 74 are formed through the container insulator 52 and the heater body 42. A shuttle actuator 76 is used to slide the lead dispensing shuttle plate 48 from a fill position to a dispensing position. An end of the shuttle plate 48 is attached to a moving end of the shuttle actuator 76.

At least two lead dispense openings 78 are formed through the shuttle retention plate 56, container insulator 60, and cover heating platen 46 in line with the at least two lead metered cavities 55 when in a dispense position. Preferably, a lead dispense bushing 80 is formed partially through the shuttle retention plate 56, and through the container insulator 60, and cover heating platen 46. When the lead dispensing shuttle plate 48 is in a dispense position inert gas flows behind the molten lead 210 through the lead dispense openings 78.

The inert gas 208 prevents air from entering through the at least two lead dispense openings 78 until the lead dispensing shuttle plate 48 is moved to a fill position. The inert gas 208 bubbles through the molten lead 210 to the inert gas reservoir passage 68 as the at least two lead metered cavities 55 are filled with molten lead 210. If air were allowed to fill the at least two lead metered cavities 78, the air would dross the molten lead 210.

At least two container heaters 82 are formed in the container heating platen 44. At least two cover heaters 84 are formed in the cover heating platen 46. At least two retainer heaters 86 are formed in the shuttle retention plate 56. At least two body heaters 88 are formed in the heater body 42. A plurality of lug clearance openings 90 are formed in a top of the container heating platen 44.

With reference to FIG. 1, the cover positioner 14 includes a cover base 92, a cover actuator 93, a mold actuator 94, and at least two terminal molds 96. A bottom of the cover base 92 is attached to a moving end of the cover actuator 93. The cover actuator 93 provides vertical motion to the cover base 92. A cover cavity 98 is formed on a top of the cover base 92 to receive the battery cover 212.

A retainer plate 100 is attached to a moving end of the mold actuator 94. Terminal cavity 102 is formed in a top of each terminal mold 96. Each terminal mold 96 is slidably retained on a slide rod 106 and urged upward with a spring 104. The retainer plate 100 restricts the upward movement of the terminal mold 96. At least one liquid coolant path 108 and at least one mold heater 109 are formed in the body of each terminal mold 96.

Gripper fingers 110 extend from a moving end of a conveyor actuator 112. A battery conveyor 114 includes a vertical conveyor actuator 116, stationary conveyor base 118, moveable conveyor section 120, and a coolant spray 122. The moveable conveyor section 120 is attached to a moving end of the vertical conveyor actuator 116. The coolant spray 122 is attached to a bottom of the moveable conveyor section 120.

Figure 5:
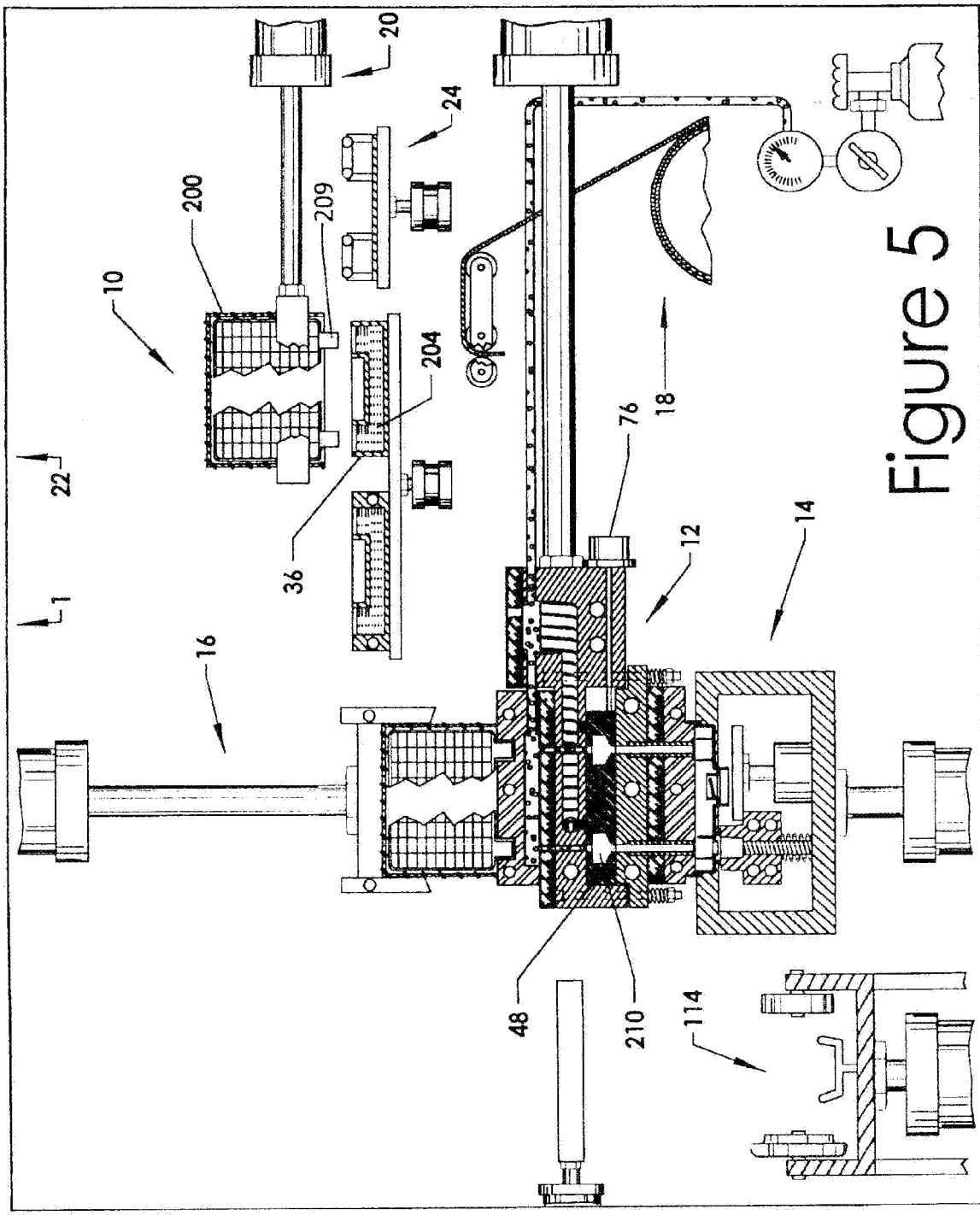
FIG. 5 is a cross sectional view of a battery assembling method showing a first battery container indexed over a fluxing station; and a shuttle plate slid to a dispense position in accordance with the present invention.
Figure 6:
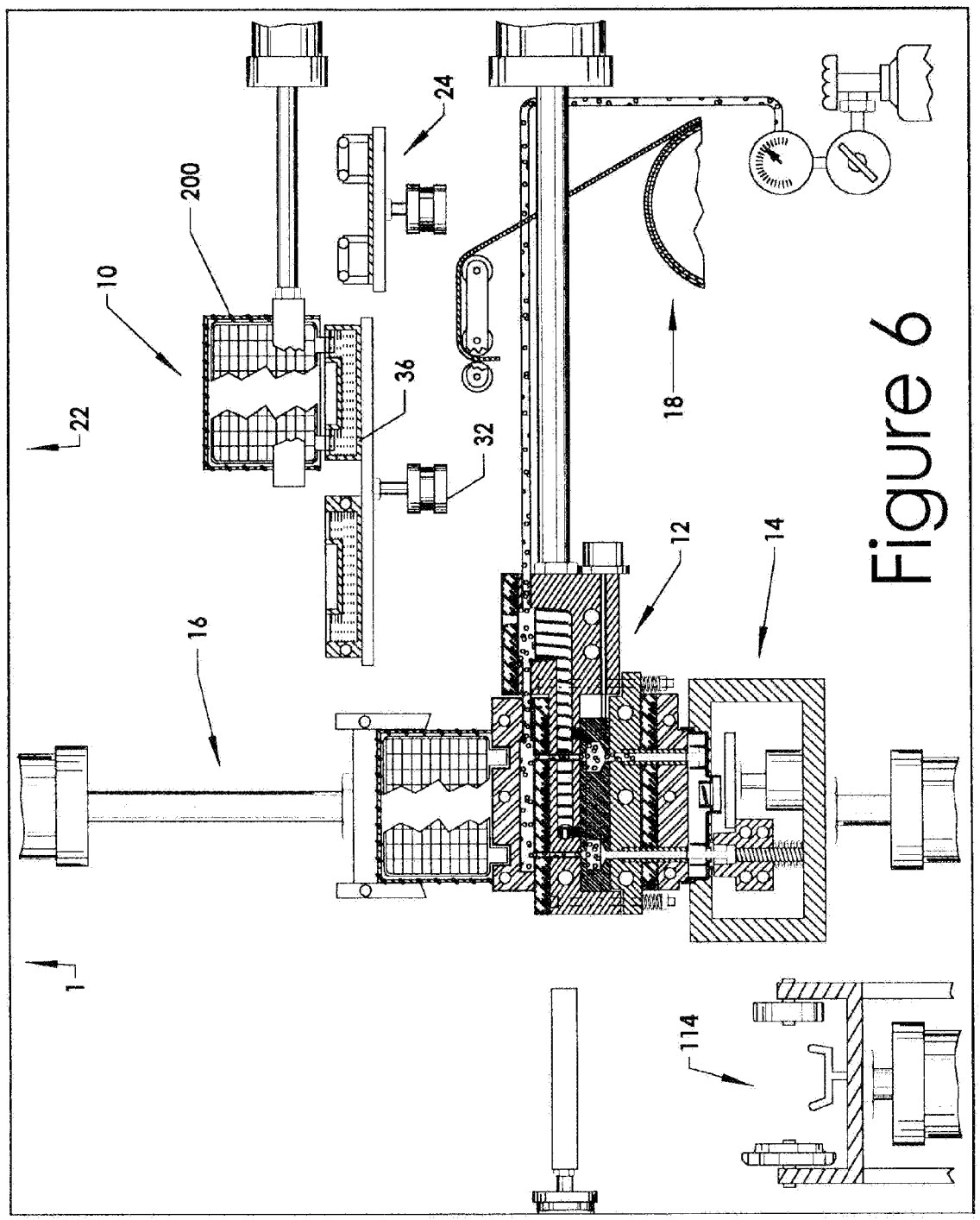
FIG. 6 is a cross sectional view of a battery assembling method showing plate lugs of a first battery container being fluxed; plate strap and terminal molds of a second battery cover being filled with molten lead in accordance with the present invention.
Figure 7:
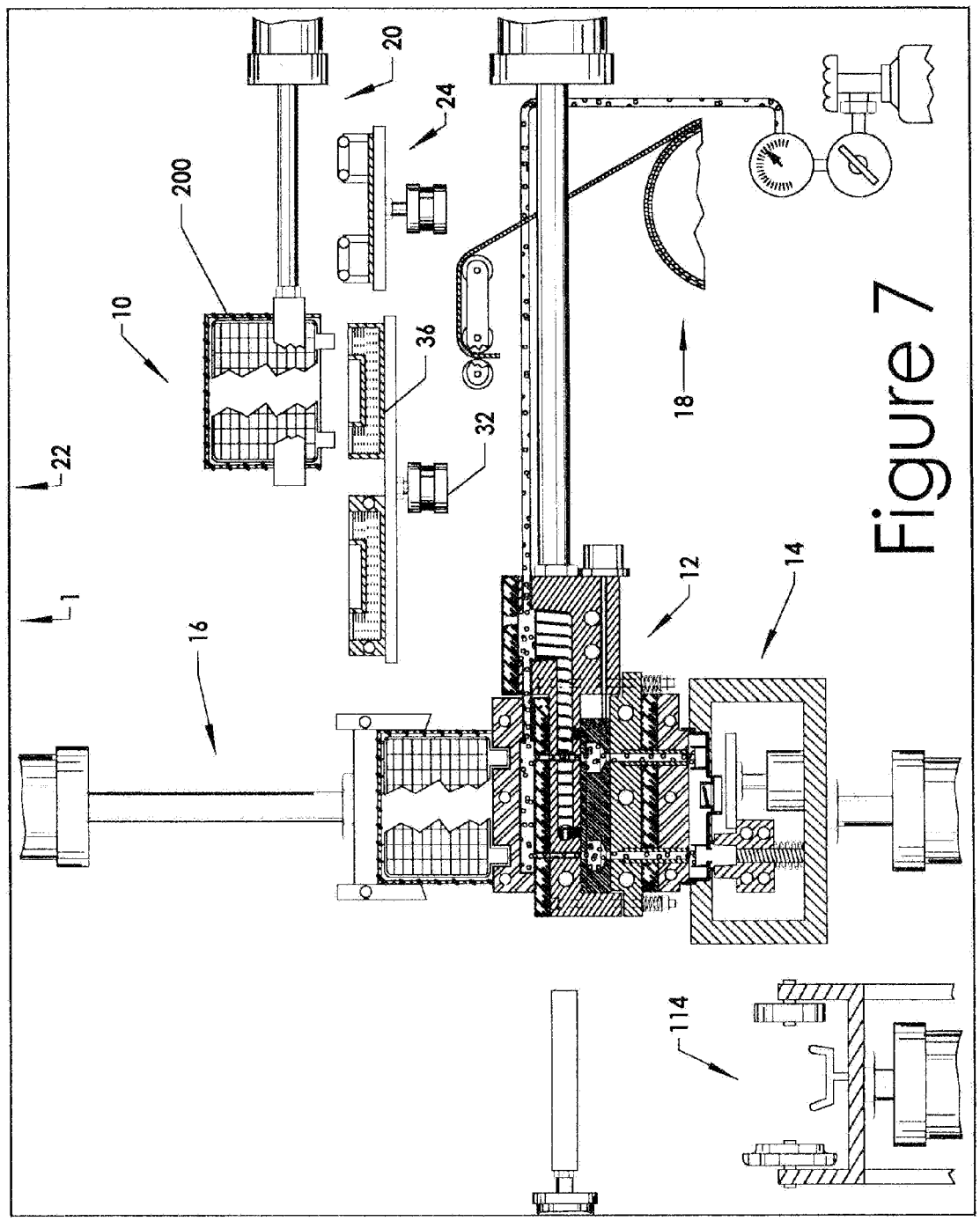
FIG. 7 is a cross sectional view of a battery assembling method showing plate lugs of a first battery container after fluxing; plate strap and terminal molds of a second battery cover filled with molten lead in accordance with the present invention.
Figure 8:
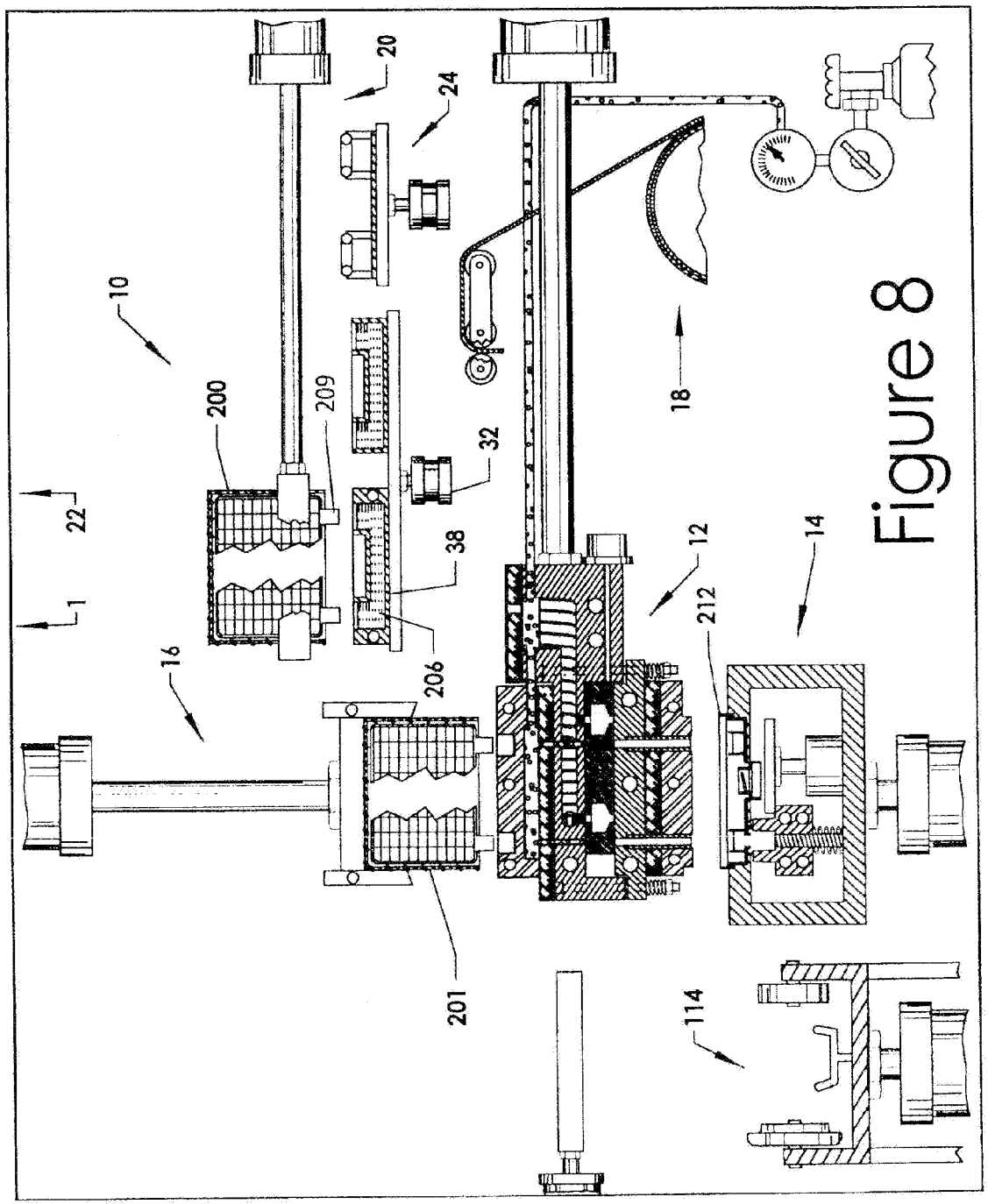
FIG. 8 is a cross sectional view of a battery assembling method showing a first battery container indexed over a tinning station; battery cover and container positioners bringing a second battery cover and container away from a lead dispenser/heater unit in accordance with the present invention.
Figure 9:
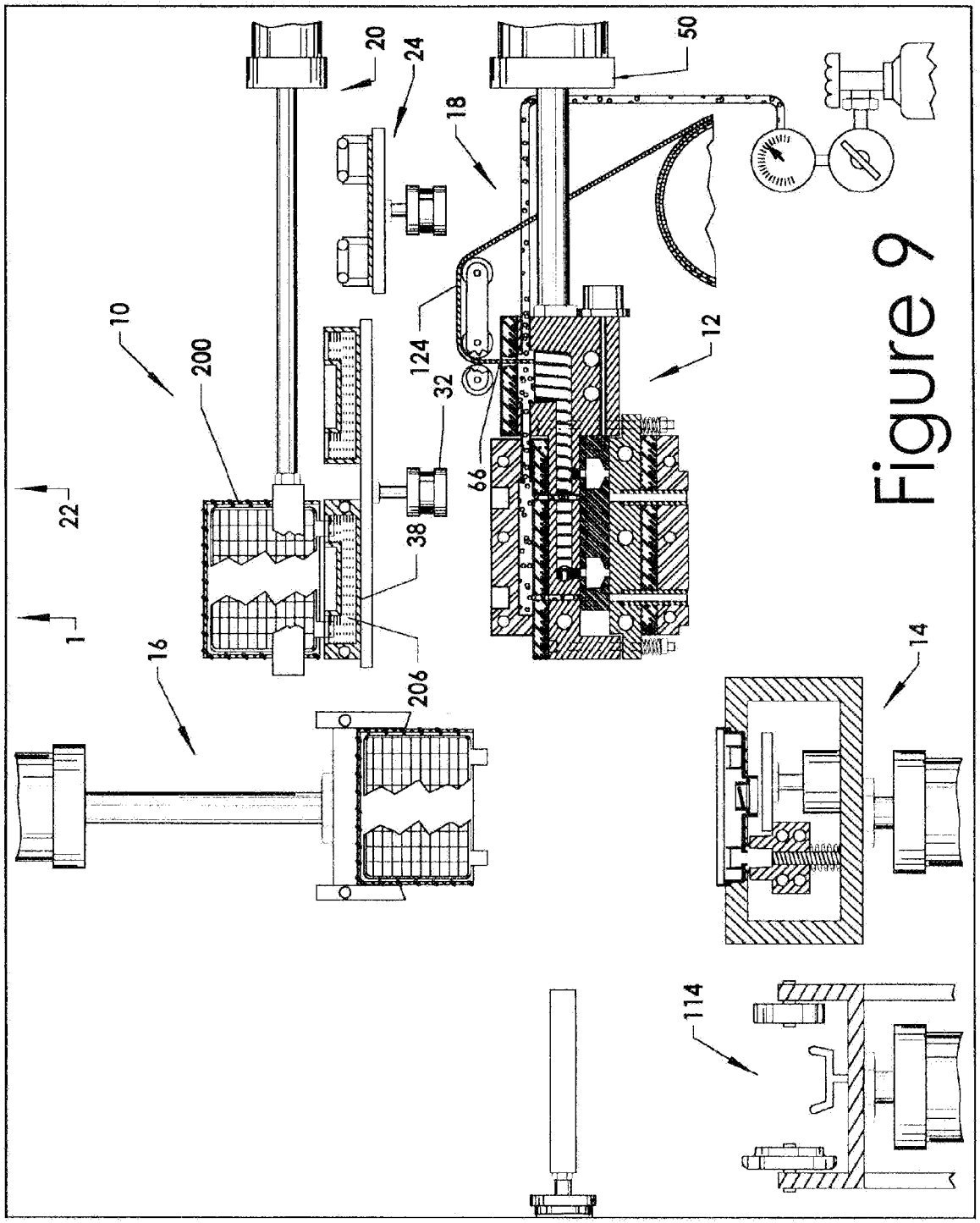
FIG. 9 is a cross sectional view of a battery assembling method showing plate lugs of a first battery container being tinned; a lead dispenser heater unit withdrawn such that thereof is replenished with lead in accordance with the present invention.
Figure 11:
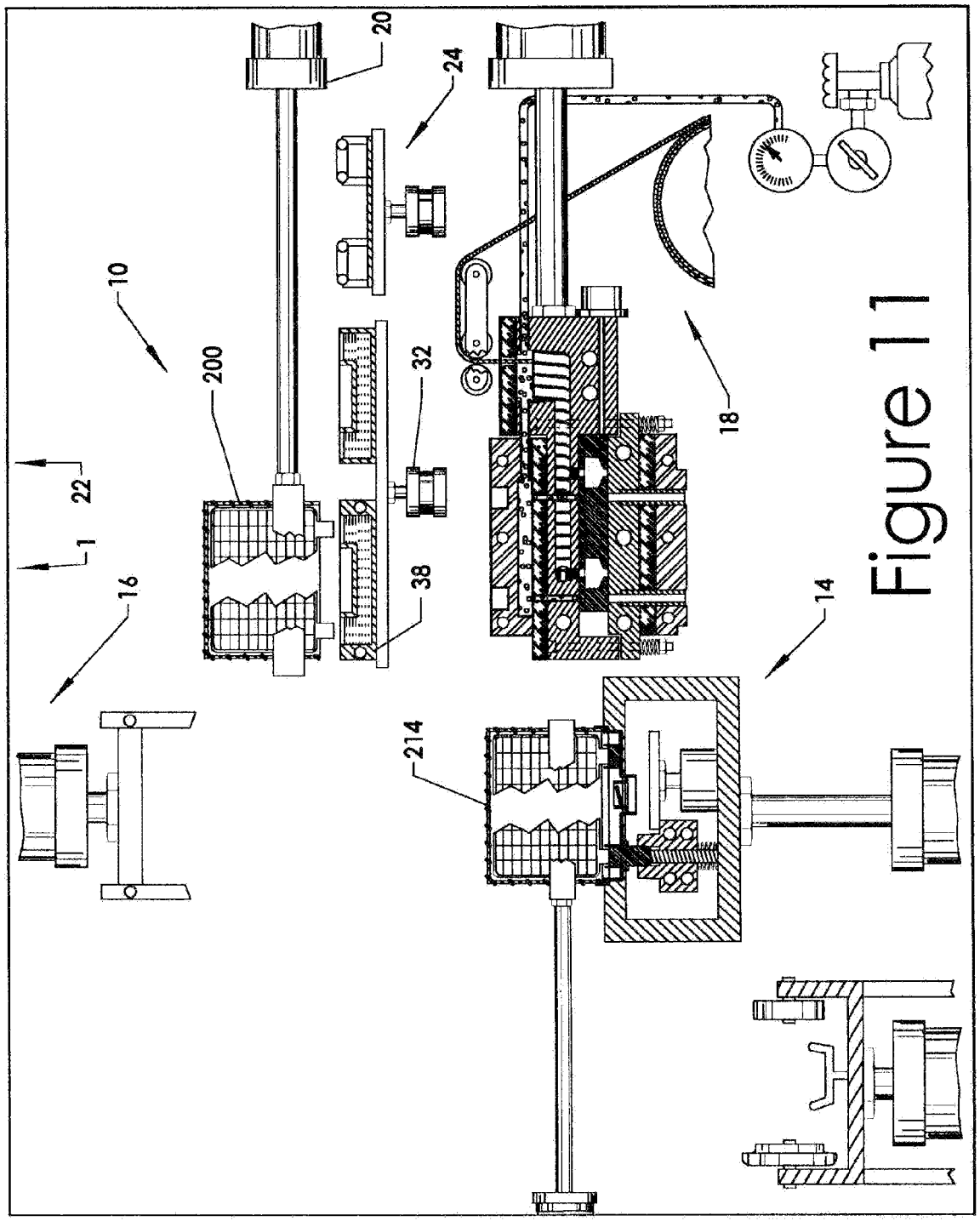
FIG. 11 is a cross sectional view of a battery assembling method showing plate lugs of a first battery container removed from a tinning station; a cover positioner withdrawing from under a second battery container in accordance with the present invention.
Figure 12:
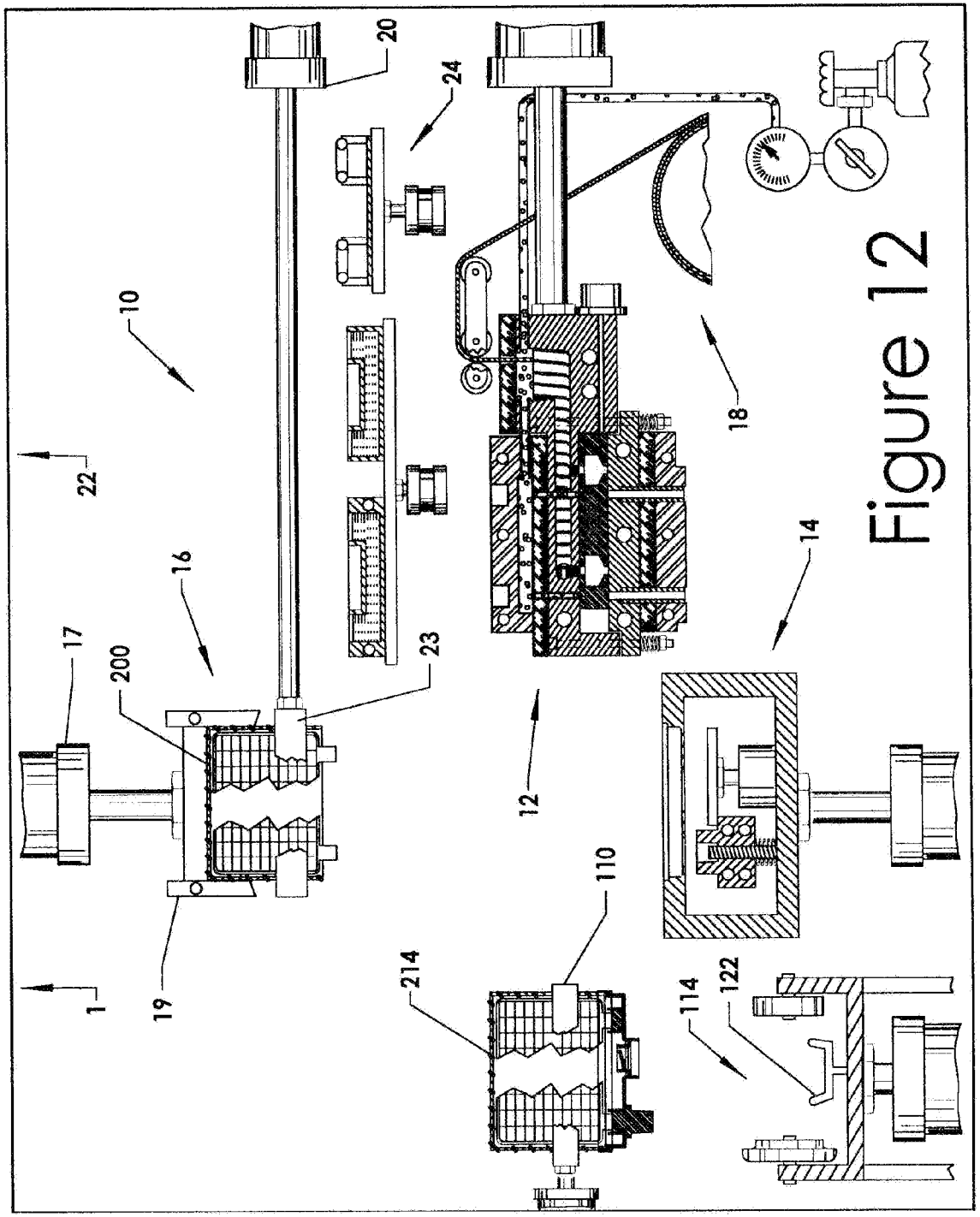
FIG. 12 is a cross sectional view of a battery assembling method showing a first battery container grasped by a container positioner; a second assembled battery grasped by a conveyer gripper and aligned with a conveyor in accordance with the present invention.

The battery assembling method preferably operates in the following manner. With reference to FIG. 1, if the lug preparation area 10 is required, the horizontal container positioner 20 indexes the battery container 200 over the lug heating station 24 and the lugs 209 of the battery plates 202 are heated before fluxing by the at least one heating element 30. With reference to FIG. 5, the horizontal container positioner 20 then indexes the battery container 200 over the fluxing pan 36. With reference to FIG. 6, the lug actuator 32 raises the fluxing pan 36 to coat the lugs 209 with flux 204. With reference to FIGS. 7 and 8, the lug actuator 32 lowers the fluxing pan 36 so that the horizontal container positioner 20 may index the battery container 200 over the tinning pan 38. With reference to FIG. 9, the lug actuator 32 raises the tinning pan 38 to tin the lugs 209 with solder 206. With reference to FIGS. 11 and 12, the lug actuator 32 lowers the tinning pan 38 and the horizontal container positioner 20 indexes the battery container 200 over the lead dispenser/heater unit 12.

Figure 3:
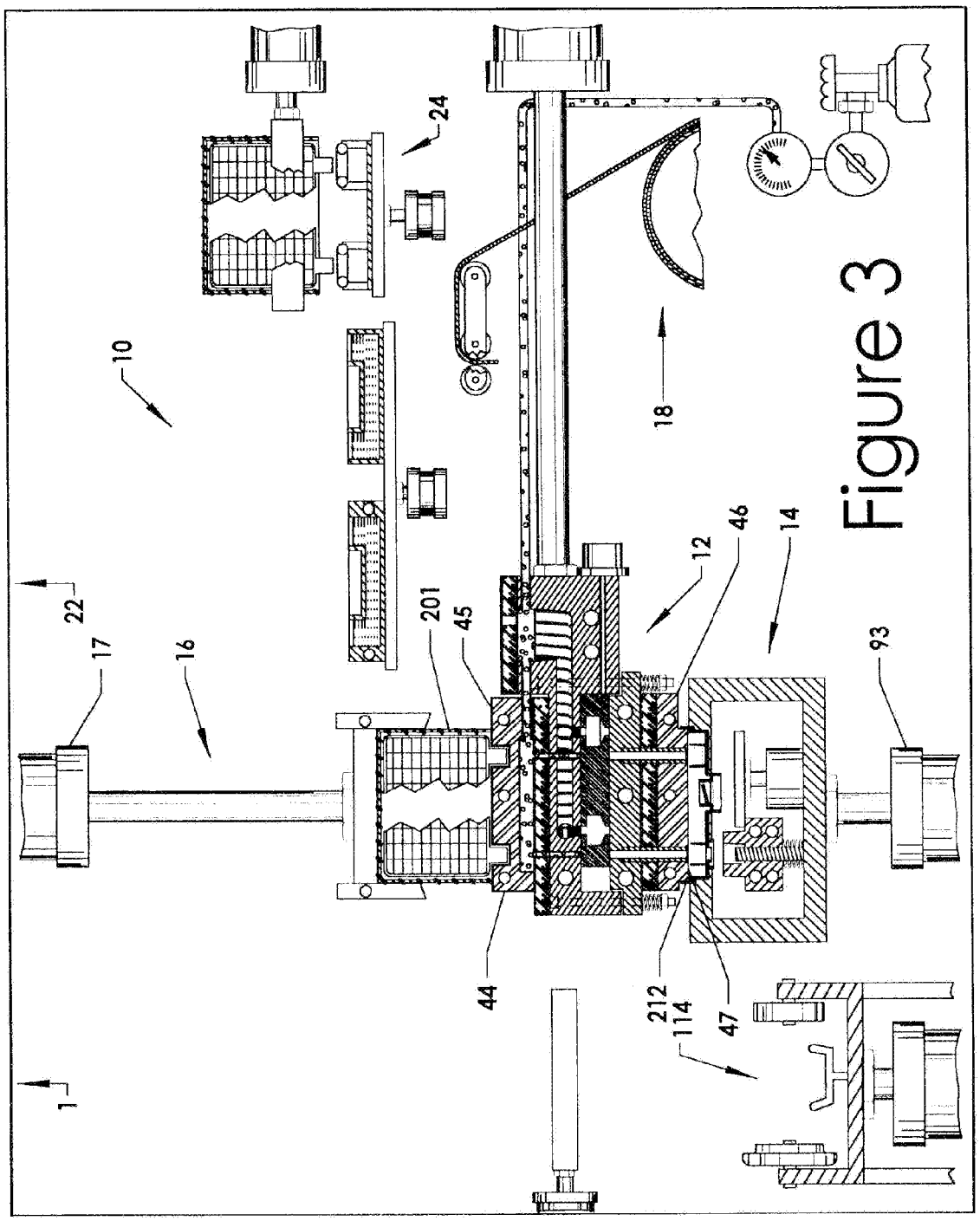
FIG. 3 is a cross sectional view of a battery assembling method where cover and container positioners have brought a second battery cover and container in contact with a lead dispenser/heater unit in accordance with the present invention.
Figure 4:
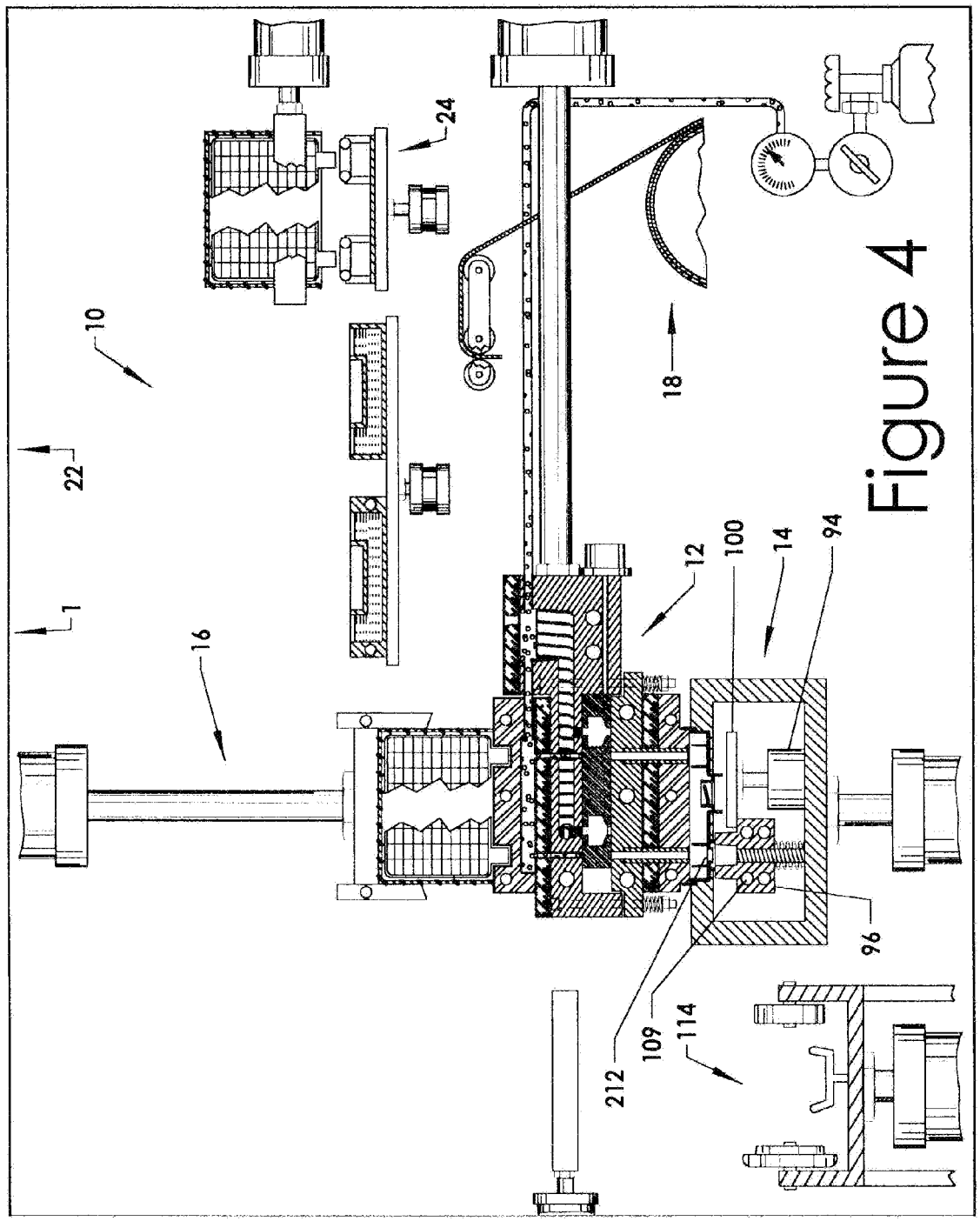
FIG. 4 is a cross sectional view of a battery assembling method where terminal molds have been brought in contact with a second battery cover in accordance with the present invention.

The container gripping fingers 19 grasp the battery container 200 and then the gripping fingers 23 release thereof. With reference to FIG. 3, the container actuator 17 lowers the battery container 200 such that an edge of an open end thereof contacts a heating surface 45 of the container heating platen 44. The cover actuator 93 raises the battery cover 212 such that an edge of an open end contacts the heating surface 47 of the cover heating platen 46. With reference to FIG. 4, the mold actuator 94 raises the retainer plate 100 such that the at least two terminal molds 96 rise to contact terminal openings in the battery cover 212. Each terminal mold 96 is heated with the heater 109. With reference to FIG. 5, the lead dispensing shuttle plate 48 is slid into a dispense position by the shuttle actuator 76. The molten lead 210 descends through the lead exit openings 57, the openings in the shuttle retaining plate 56, and the lead bushings 80. The molten lead drops into plate strap mold wells in the battery cover 212 and the terminal molds 96 form plate straps and terminals.

After the molten lead has filled the plate strap mold wells and terminal molds 96, the shuttle actuator 76 pulls the dispensing shuttle plate 48 back to the fill position. With reference to FIG. 9, the dispenser actuator 50 pulls the lead dispenser/heater unit 12 back such that the strip opening 66 aligns with a lead strip 124 of the lead feeder 18. The lead 210 that was dispensed for previous battery is replaced with new lead from the lead feeder 18. With reference to FIG. 8, the battery container 201 is raised and the battery cover 212 lowered and the lead dispenser/heater unit 12 pulled toward the lead feeder 18.

Figure 10:
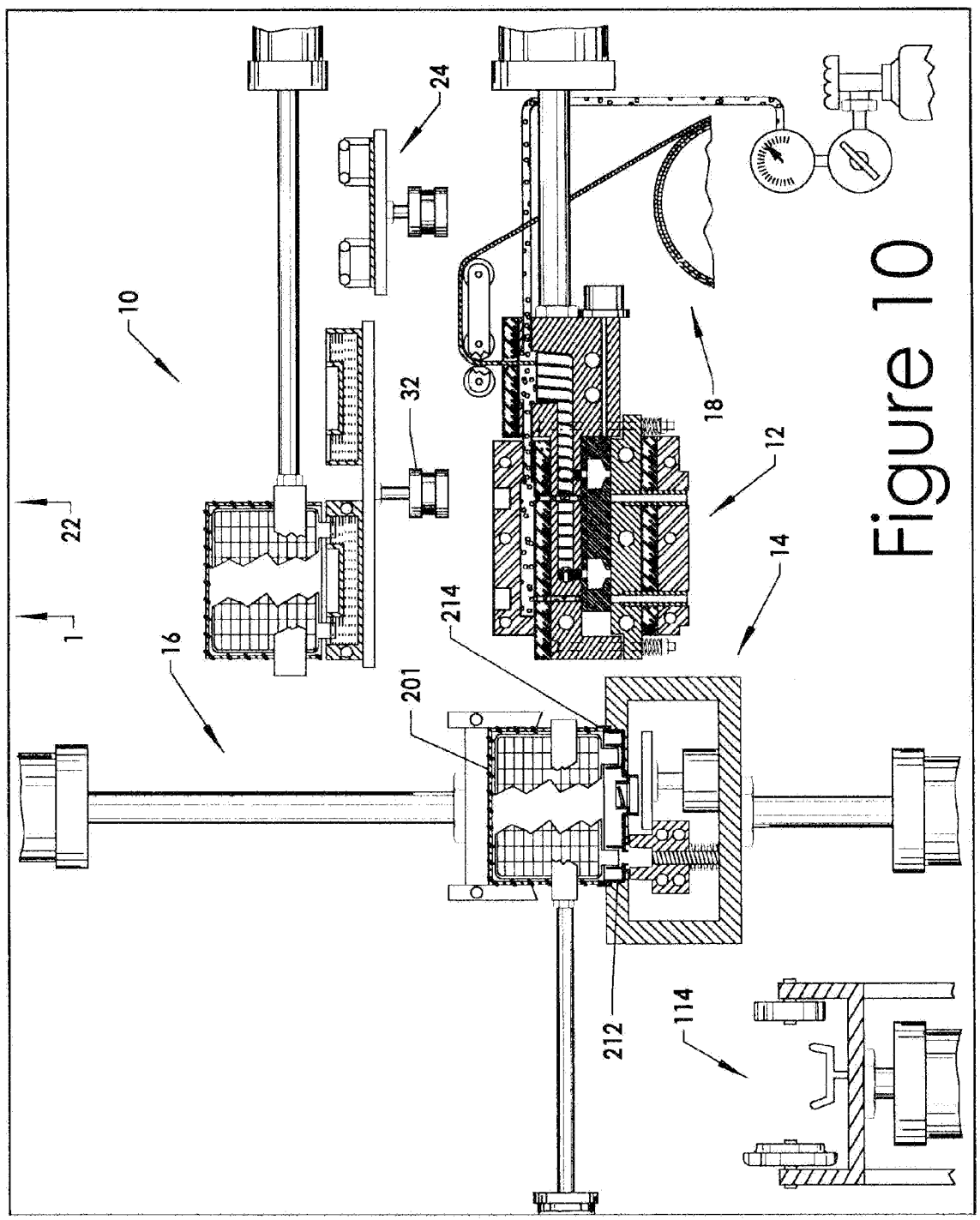
FIG. 10 is a cross sectional view of a battery assembling method showing a second battery cover being heat sealed to a second battery container in accordance with the present invention.

With reference to FIG. 10, after the lead dispenser/heater unit 12 is cleared away, the battery container 201 is lowered and the battery cover 212 raised such that the edge of the open end of the battery container 201 is attached to the edge of the open end of the battery cover 212. The container and cover edge heating platens heat the open ends of the battery container and cover such that the battery cover 212 may be sealed to the battery container 201. The at least two plate straps and terminals are substantially simultaneously cast as the battery cover is sealed to the battery container.

Figure 13:
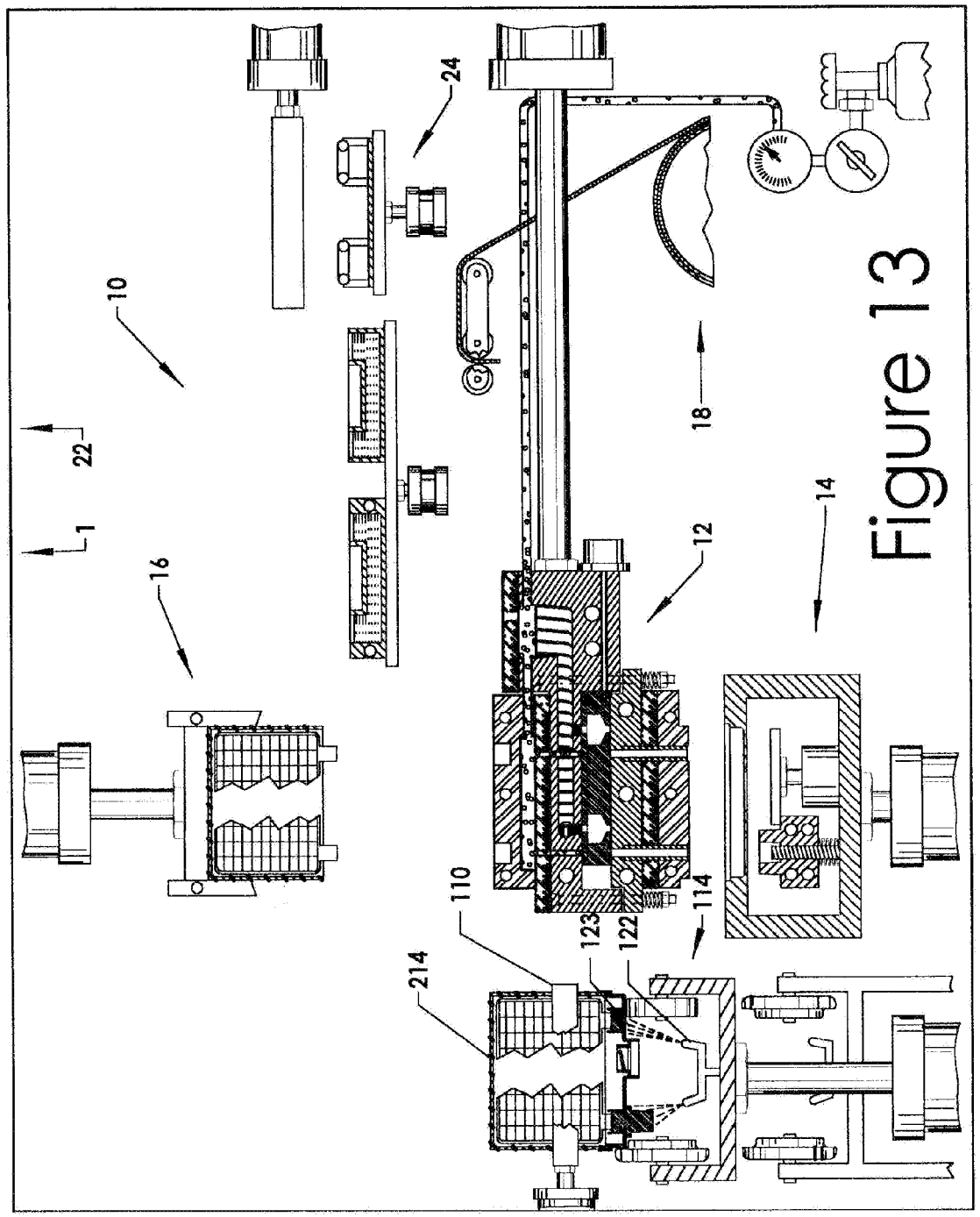
FIG. 13 is a cross sectional view of a battery assembling method showing a movable conveyor section raised to meet a second assembled battery; a lead dispenser/heater unit positioned to receive a new second battery container in accordance with the present invention.
Figure 14:
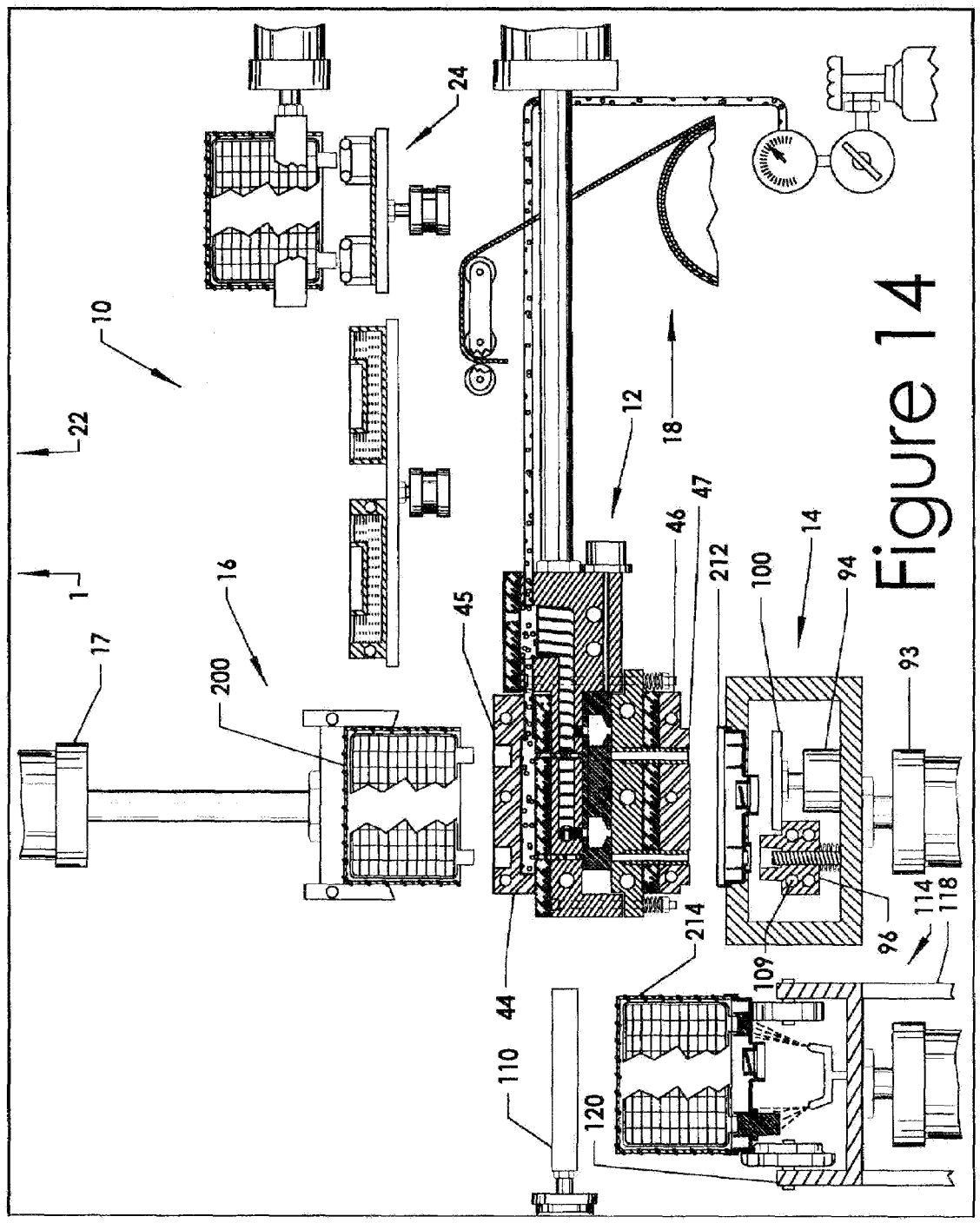
FIG. 14 is a cross sectional view of a battery assembling method showing a new first battery indexed over a heating station; a new second battery container loaded into a container positioner in accordance with the present invention.

The mold heater 109 is turned-off and coolant is run through the at least one coolant path 108. With reference to FIG. 13, once the lead in plate straps and terminals solidify, the assembled battery 214 is grasped by the conveyer gripper 110 and aligned with the conveyor 114 by a conveyer actuator 112. The moveable conveyor section 120 is raised by the vertical conveyer actuator 116 to meet the assembled battery 214. The assembled battery 214 is sprayed with coolant 123 from a coolant spray device 122. With reference to FIG. 14, the conveyer gripper 110 is released and the moveable conveyor section 120 lowers the assembled battery 214 even with the stationary conveyer base 118. The conveyer 114 transports the assembled battery 214 to an external location where the assembled battery 214 is ready to be filled with electrolyte.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A heater unit for dispensing metered portions of molten lead, the heater unit comprising:
   a lead reservoir in the heater unit for retaining molten lead;
   a heater body adjacent to the reservoir for providing heat to the molten lead;
   a cavity in the heater unit capable of selectively receiving a metered portion of molten lead from the lead reservoir;
   a mechanical actuator supporting the lead reservoir, heater body and cavity for conjoint movement between a first position for receiving lead into the lead reservoir and a second position for dispensing molten lead from the cavity.

2. A heater unit as set forth in claim 1 further comprising a container heater and a cover heater, the container heater being adapted to heat an open end of a battery container and the cover heater being adapted to heat an open end of a battery cover at substantially the same time for sealing the cover to the container.

3. A heater unit as set forth in claim 2 wherein the container heater includes lug openings for receiving lugs of a battery plate, the container heater being adapted to heat the battery plate lugs simultaneously with the open end of the battery container.

4. A heater unit as set forth in claim 2 wherein the container heater and the cover heater can be maintained at a temperature different from a temperature of the heater body.

5. A heater unit as set forth in claim 1 further comprising a shuttle plate moveable relative to the lead reservoir between a fill position and a dispense position, the cavity being located in the shuttle plate for movement with the shuttle plate, the cavity dispensing the metered portion of molten lead when in the dispense position.

6. A heater unit as set forth in claim 1 further comprising passages in the heater unit for directing an inert gas generally above the lead reservoir and into the cavity.

7. A heater unit as set forth in claim 1 further comprising a lead passage for receiving a strip of lead into the lead reservoir when the apparatus is in the first position, the heater body being capable of providing heat to melt the strip of lead to form the molten lead.

8. A heater unit for dispensing metered portions of molten lead, the heater unit comprising:
   a lead reservoir in the heater unit for retaining molten lead, the lead reservoir including an opening for delivering lead from the reservoir;
   a heater body adjacent to the reservoir for providing heat to the molten lead;
   a shuttle plate having a cavity therein sized to receive a predetermined amount of molten lead for dispensing a metered amount of lead, the cavity including an exit opening, the shuttle plate being slidably mounted on the heater unit for movement relative to the lead reservoir and heater body between a fill position in which the cavity is in fluid communication with the opening in the reservoir for receiving molten lead from the reservoir and the exit opening of the cavity is blocked, and a dispense position in which the cavity is out of fluid communication with the lead reservoir and the exit opening of the cavity is unblocked for dispensing a metered amount of molten lead from the cavity.

9. A heater unit as set forth in claim 8 wherein the heater body is adjacent to the shuttle plate for maintaining lead in the cavity in a molten state.

10. A heater unit as set forth in claim 9 wherein the heater body receives at least a portion of the shuttle plate.

11. A heater unit as set forth in claim 8 further comprising passages in the heater unit for directing an inert gas.

12. A heater unit as set forth in claim 11 wherein the cavity is in fluid communication with the inert gas passages in the dispense position.

13. A heater unit as set forth in claim 8 further comprising another opening in the lead reservoir and another cavity having an exit opening in the shuttle plate, said other cavity being in fluid communication with said other opening in the lead reservoir in the fill position and the exit opening of said other cavity being blocked in the fill position.

* * * * *